United States Patent [19]

Jumel

[11] Patent Number: 4,581,307
[45] Date of Patent: Apr. 8, 1986

[54] HIGH SPECIFIC ENERGY ELECTROCHEMICAL CELL WITH LOW INITIAL IMPEDANCE

[75] Inventor: Yves Jumel, Poitiers, France

[73] Assignee: Saft, S.A., Romainville, France

[21] Appl. No.: 715,348

[22] Filed: Mar. 25, 1985

[30] Foreign Application Priority Data

Mar. 28, 1984 [FR] France ................... 84 04839

[51] Int. Cl.⁴ ............................................. H01M 6/14
[52] U.S. Cl. ........................................ 429/194; 429/196
[58] Field of Search ....................... 429/194, 196, 218

[56] References Cited

U.S. PATENT DOCUMENTS

| | | | |
|---|---|---|---|
| 4,195,123 | 3/1980 | Jumel | 429/194 |
| 4,223,078 | 9/1980 | Armand et al. | 429/194 |
| 4,229,509 | 10/1980 | Margalit | 429/194 |
| 4,268,587 | 5/1981 | Farrington et al. | 429/194 X |
| 4,333,994 | 6/1982 | Urry | 429/194 X |

FOREIGN PATENT DOCUMENTS 2007903 5/1979 United Kingdom.

*Primary Examiner*—Charles F. Lefevour
*Attorney, Agent, or Firm*—Kenyon & Kenyon

[57] ABSTRACT

A high specific energy electrochemical cell comprises: a negative active material (4) based on an alkali metal or on an alkaline-earth metal; a separator (8); a non-aqueous liquid electrolyte; and a positive electrode comprising a solid active mass (5). The positive mass is provided, on its electrolyte side, with a porous and electron conductive metal covering (12) which does not participate in the electrochemical reaction, whose thickness is of the order of a few microns, and which is in contact with the metal portions serving as a positive current collector. The covering greatly reduces the initial impedance of the cell.

4 Claims, 3 Drawing Figures

HIGH SPECIFIC ENERGY ELECTROCHEMICAL CELL WITH LOW INITIAL IMPEDANCE

The present invention relates to a high specific energy electrochemical cell with low initial impedance.

It relates to a cell whose negative active material is based on an alkali metal or on an alkaline-earth metal, the electrolyte is a non-aqueous liquid which may organic or inorganic, and its positive electrode includes a solid active mass. This mass may be an inert solid material (a cathecter) and a solid active material based on oxides (of lead, copper, manganese, etc . . . ), on sulfides (of iron, etc . . . ) or on oxidized salts (of chromium, molybdenum, etc . . . ).

BACKGROUND OF THE INVENTION

Positive active materials do not, in general, conduct electrons and it is necessary to add an electron conductor to them to provide the positive electrode with sufficient electron conductivity to convey the required currents, while avoiding presenting an initial voltage which is so high as to be incompatible with the utilization.

French published patent specification No. 2 316 756 describes various compositions of positive active masses intended to solve this problem. In particular, reducing agents which participate in the electrochemical reaction are added to the positive active masses, in proportions in the range of 10% to 20% by weight. However, in some special applications it is necessary to immediately obtain as low an impedance level as possible, or an impedance level which is close to the average discharge level, and the previously described means as inadequate for such applications since the initial impedance of the cells made in that way is high.

The present invention proposes to remedy this drawback and to supply an electrochemical cell having low initial impedance and whose initial voltage is practically the same as its operating voltage.

SUMMARY OF THE INVENTION

The present invention provides a high specific energy electrochemical cell comprising a negative active material based on an alkali metal or on an alkaline-earth metal, a separator, a non-aqueous liquid electrolyte, and a positive electrode comprising a solid active mass, wherein the said positive mass is provided on its electrolyte side with a porous and electron conductive metal covering which does not participate in the electrochemical reaction, whose thickness is of the order of a few microns, and which is in contact with the metal portions serving as a positive current collector.

The metal covering covers the solid mass of the electrode regardless of the surface appearance thereof; it thus extends over "bumps" and "dents".

Such a covering which provides uninterrupted electron conduction while retaining a degree of porosity may advantageously be made by vacuum metallization or by any other method known to the person skilled in the art for projecting or depositing metals or their alloys in liquid or gaseous form.

Compatible metals for making such a deposit are chosen from the group constituted by: lead, tin, gold, bismuth, zinc, cadmium, and aluminum, with aluminum being particularly well adapted and well mastered for making metal deposits in vacuo.

This porous covering situated at minimal distance from the anode reduces the purely ohmic drop of the system. Further, it increases the initial number of reaction sites, thereby reducing the polarization of the electrochemical system. Since the parameters determining the impedance of the electrochemical cell are its ohmic drop and its polarization, the impedance is greatly reduced and the cell can reach its stationary state almost immediately.

BRIEF DESCRIPTION OF THE DRAWINGS

An embodiment of the invetion is described by way of example with reference to the accompanying drawings, in which.

MORE DETAILED DESCRIPTION

Figure 1:
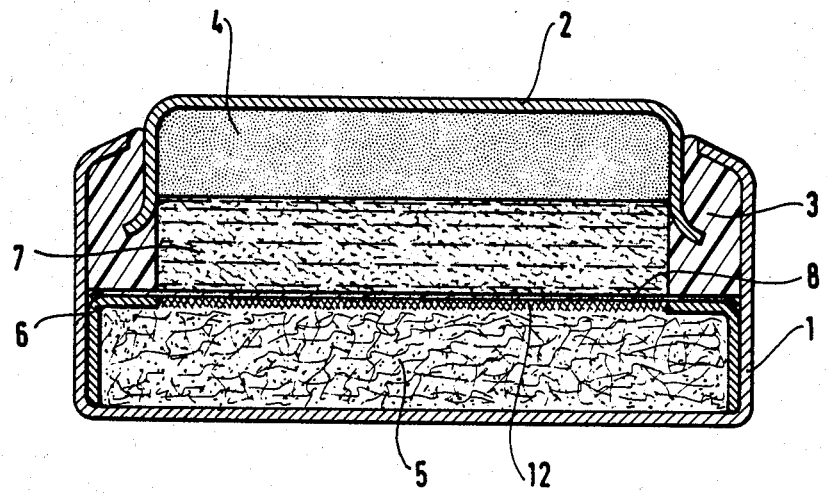
FIG. 1 is a diagrammatic section through an electrochemical cell of the lithium battery type and in accordance with the invention.

Test have been performed on cells of the type shown in FIG. 1 which shows a button cell having a diameter of 11.5 mm and thickness of 5.4 mm.

The envelope of the cell is composed of a negative cup 2 and a positive cup 1, both of which are made of metal, e.g. stainless steel. The lithium-based negative electrode 4 is lodged in the cup 2. A positive mass 5 lodged in the cup 1 is held in place by a metal ring 6. It is separated from the negative electrode 4 by a separator constituted by several layers 7 of cellulose felt and a microporous sheet 8. This separator is impregnated with an organic liquid electrolyte. The assembly is sealed by means of a polypropylene seal 3. The positive mass 5 is a compressed mixture of lead powder and of lead bismuthate powder in which the lead powder constitutes a reducing agent which participates in the electrochemical reaction. The positive mass 5 weighs slightly more than 1 gram and is in the form of a pellet which is 8.7 mm in diameter and 1.35 mm thick.

In accordance with the invention the face of the positive mass 5 which is turned towards the separator 7 is provided with a porous covering 12 of aluminum. The thickness of this covering is a few microns and it is deposited by in vacuo metallization. This covering is in contact with the metal ring 6, which is itself in contact with the positive cup 1 which serves as a terminal of the cell.

For a covering which is two microns thick, the mass of aluminum used in about 0.9 mg, i.e. less than 0.1% of the total positive active mass.

Thirty prior art cells were made, i.e. without the covering 12, and thirty cells in accordance with the invention were also made. Table I shows the values of the impedance of the cells as measured prior to discharge. (These values and their variations are arithmetic means).

TABLE 1

|  | Initial impedance | Dispersion |
| --- | --- | --- |
| Prior Art Cells | 512 ohms | ±132 ohms |
| Cells in Accordance with the Invention | 210 ohms | ±42 ohms |

Figure 2:
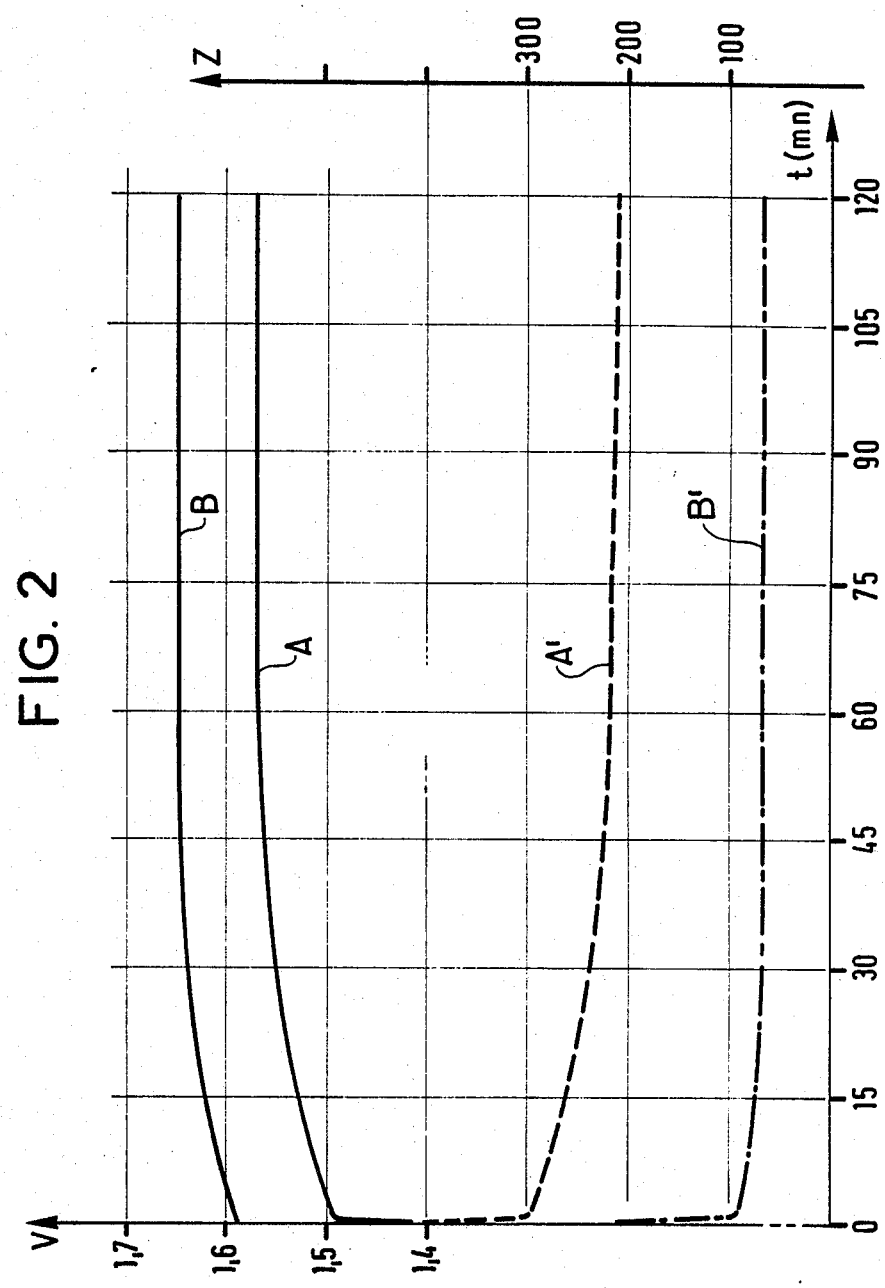
FIG. 2 is a graph showing the variations in the voltage V and the impedance Z of prior art cells and of cells in accordance with the invention during the first few minutes of discharge plotted as a function of time t.

Reference is now made to FIG. 2 which shows the variation in the voltage V and the impedance Z (in ohms) as a function of time t in minutes:

for prior art cells (voltage curve A and impedance curve A'); and for cells in accordance with the invention (voltage curve B and impedance curve B').

The discharge was performed through a 5 KΩ resistance.

An examination of Table I and FIG. 2 clearly shows the advantage of the covering 12 which gives the cells initial characteristics which are greatly improved and which are practically identical to the characteristics of a cell in the stationary state.

It is also essential to point out that the existence of a covering in accordance with the invention has no ill effects on the performance per unit volume of the electrochemical system concerned. This point constitutes the second essential advantage of the invention. In practically all lithium anode systems having an organic or an inorganic electrolyte and based on oxides, sulfides or oxidized salts of chromium, molybdenum, etc . . . , the electrochemical reactions caused by the system discharging take place via an accumulation of discharge products in the cathode. This phenomenon gives rise to a considerable increase in the volume of the cathode even if its initial porosity is high, which increase may be as much as 100% of the initial volume depending on the system used. This thermodynamic increase is unavoidable and any limitation thereon has an initial effect of excessively polarizing the system (due to a reduction in the number of active sites) and a subsequent effect of a premature end to discharge due to the reaction becoming blocked.

In accordance with the invention, although the deposited metal covering is sufficient to ensure optimal starting of the system, it does not constitute a brake on the expansion of the cathode during discharge of the electrochemical cell.

Figure 3:
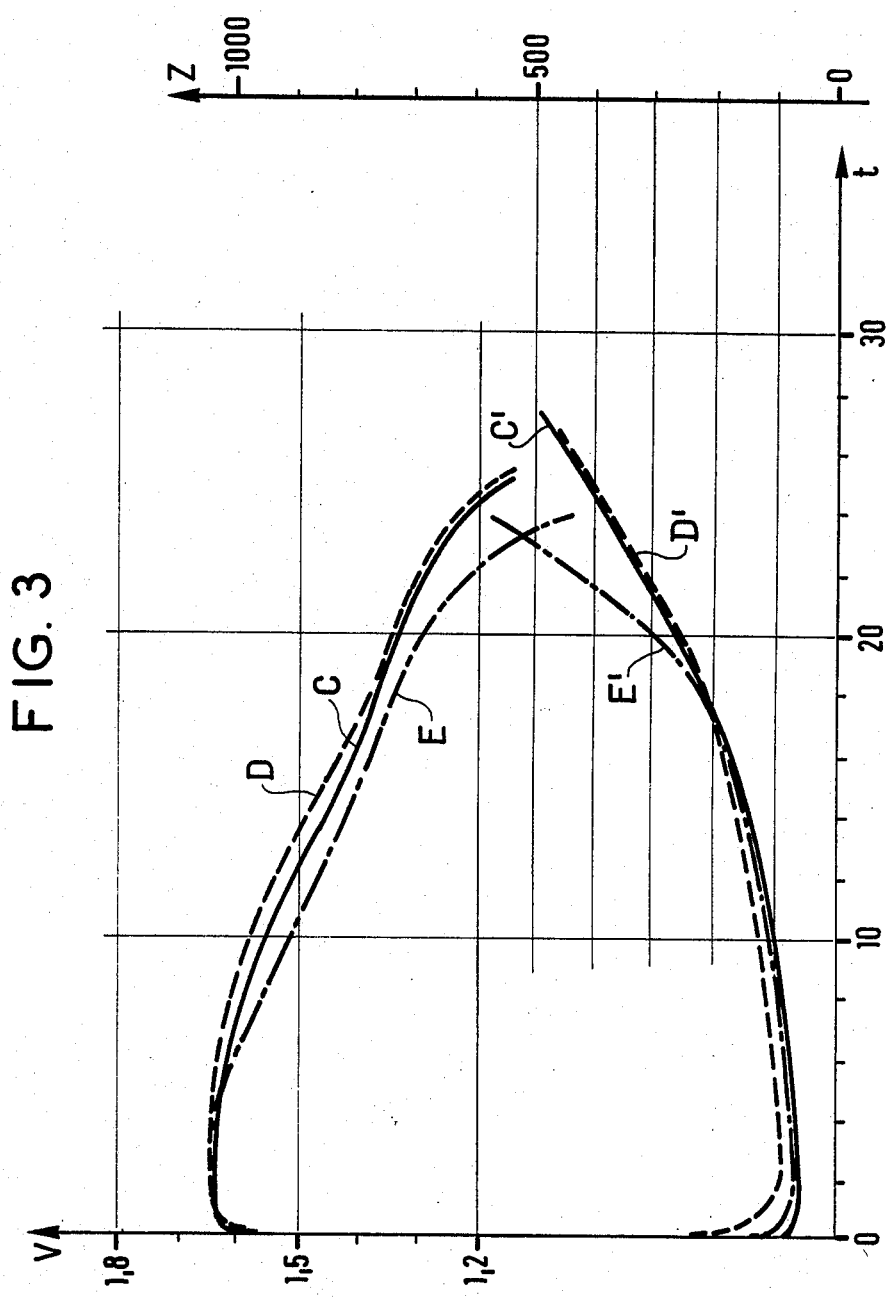
FIG. 3 is a graph showing similar curves to FIG. 2, but for a discharge period extending over several tens of days.

FIG. 3 demonstrates the above explanation. In this figure voltage curves V (D, E, C) and impedance curves Z (D', E', C') are obtained by discharging cells identical to those described above. Time t is expressed in days.

The curves D, D' show the characteristics obtained on prior art cells, the curves E, E' show the characteristics obtained on prior art cells in which the cathode is covered with a fine woven metal grid; and curves C, C' show the characteristics obtained using cells in accordance with the invention.

It can be seen that a mechanical artifice (such as a grid or a thin perforated metal sheet) also makes it possible to improve the initial characteristics of the cell, but does not enable optimal efficiency to be obtained because of the mechanical disturbance which it applies to the system. No substantial loss is observed in cells in accordance with the invention.

Naturally, the invention is in no way limited to the example which has been described. Any means could be replaced by equivalent means without going beyond the scope of the invention.

I claim:

1. A high specific energy electrochemical cell including a negative active material selected from the group consisting of an alkali metal and an alkaline-earth metal, a positive electrode comprising a solid active mass, a separator disposed between the negative active material and the positive electrode, a non-aqueous liquid electrolyte contacting the negative active material and the positive electrode, and a positive current collector having metal portions, wherein the improvement comprises:

the entire surface of said positive electrode exposed to the electrolyte being covered with a porous and electron conductive metal coating which does not participate in the electrochemical reaction, the thickness of the coating being of the order of a few microns, and the coating being in contact with the metal portions of the positive current collector.

2. An electrochemical cell according to claim 1, wherein the coating is a vacuum-deposited metal layer.

3. An electrochemical cell according to claim 1, wherein the metal of said coating is chosen from the group consisting of lead, tin, gold, bismuth, zinc, cadmium, aluminum, and alloys thereof.

4. An electrochemical cell according to claim 1, wherein the positive electrode comprises an active material chosen from the group consisting of metal oxides, metal sulfides, and oxidized salts.

* * * * *